July 22, 1924.
W. M. JONES, JR
1,502,504
AUTOMOBILE STEERING KNUCKLE AND AXLE
Original Filed April 21, 1921   3 Sheets-Sheet 1
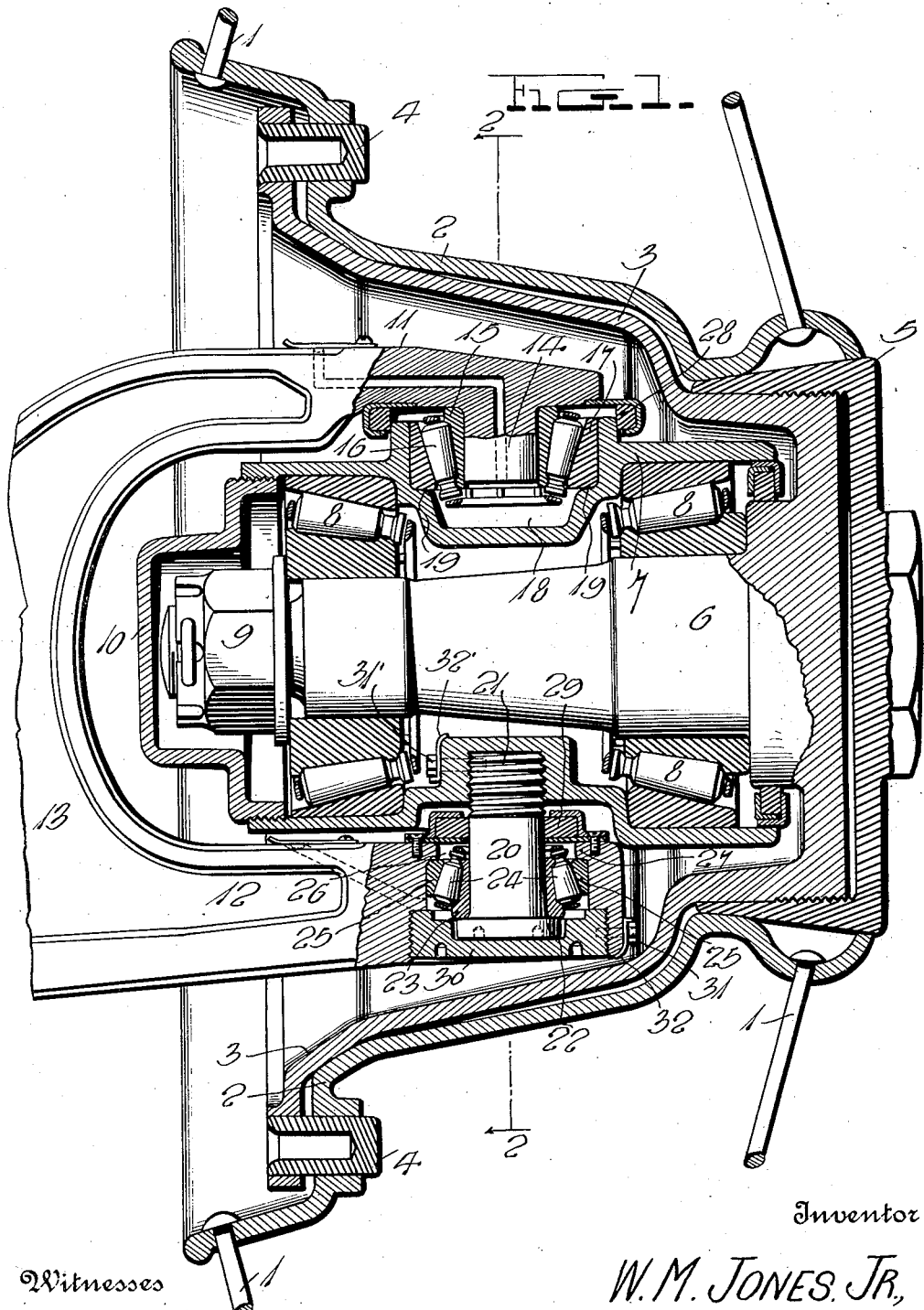
Witnesses
H. Woodard
Inventor
W. M. JONES, JR,
By H. B. Willson & Co
Attorneys July 22, 1924.  
W. M. JONES, JR  
1,502,504
AUTOMOBILE STEERING KNUCKLE AND AXLE
Original Filed April 21, 1921  3 Sheets-Sheet 2
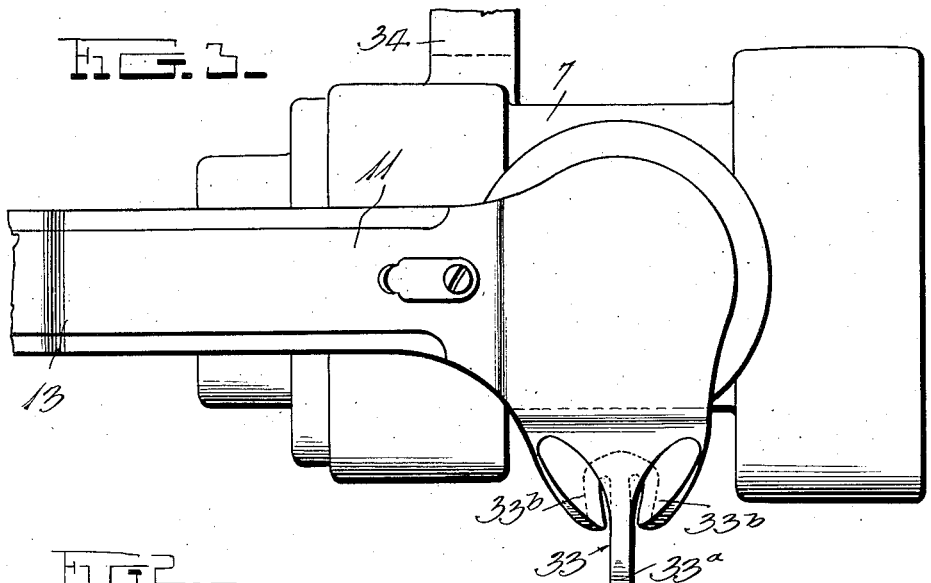
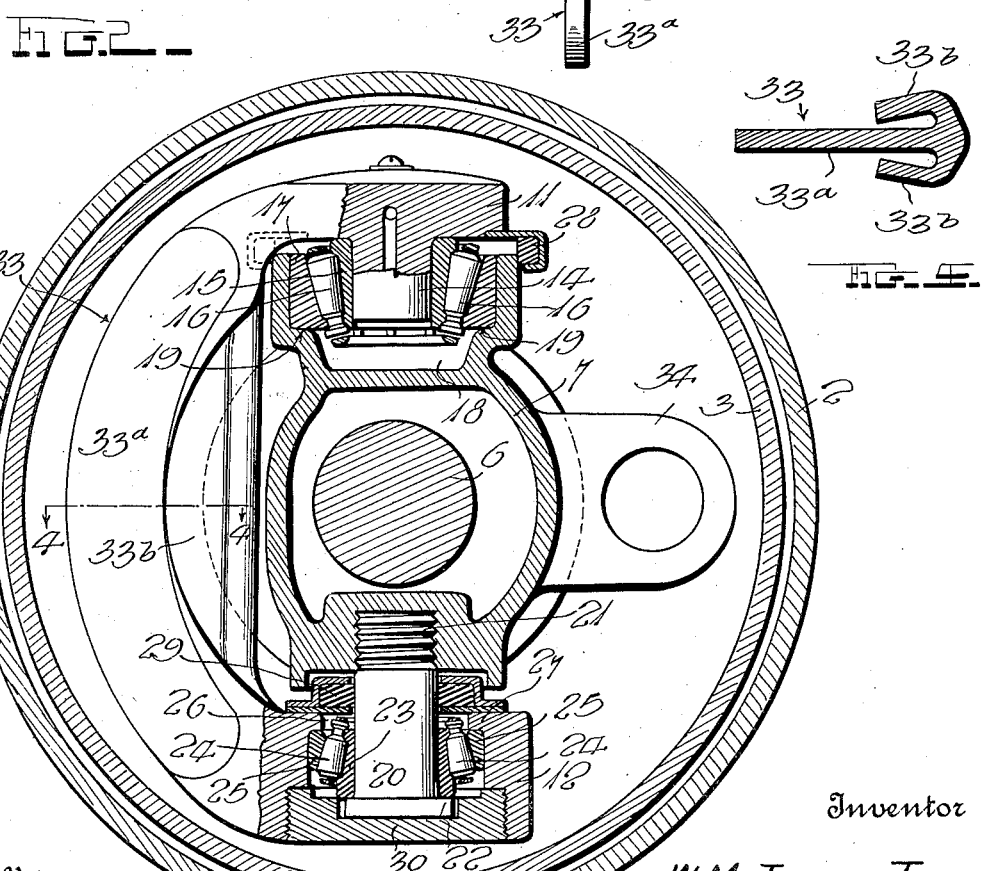
Witnesses  
H. Woodard
Inventor  
W. M. JONES, JR.  
By H. B. Willson &co  
Attorneys

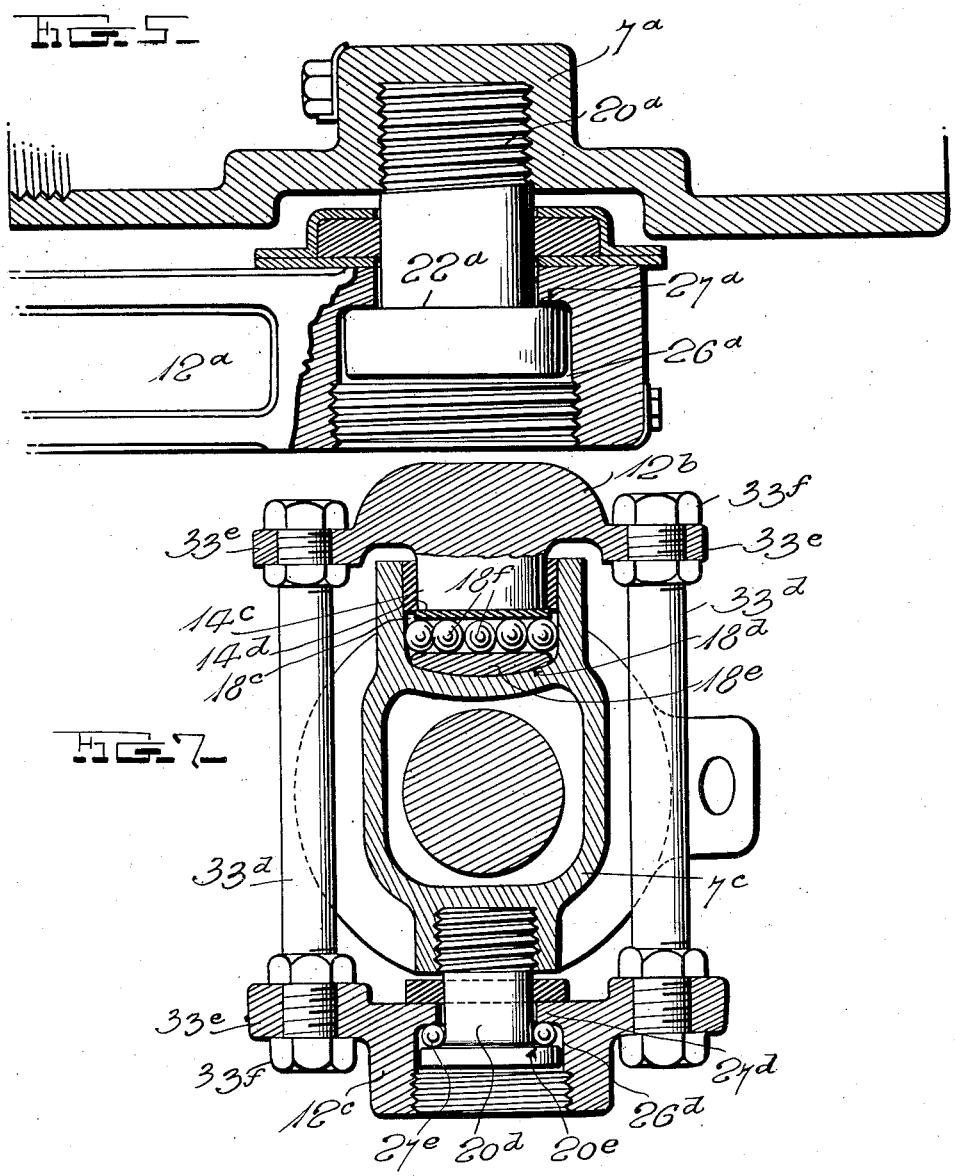

Patented July 22, 1924.

1,502,504

UNITED STATES PATENT OFFICE.

WILLIAM MARTIN JONES, JR., OF ROCHESTER, NEW YORK.

AUTOMOBILE STEERING KNUCKLE AND AXLE.

Application filed April 21, 1921, Serial No. 463,114. Renewed December 26, 1923.

*To all whom it may concern:*

Be it known that I, WILLIAM MARTIN JONES, Jr., a citizen of the United States, residing at Rochester, in the county of Monroe and State of New York, have invented certain new and useful Improvements in Automobile Steering Knuckles and Axles; and I do declare the following to be a full, clear, and exact description of the invention, such as will enable others skilled in the art to which is appertains to make and use the same.

My invention relates to improvements in automobile steering knuckles and front axles and the present disclosure is directed more particularly to a construction in which the front wheel spindle is rigidly carried by the wheel and its bearing pivotally mounted between the upper and lower fork arms of the front axle.

One object of the invention is to provide a construction in which both the upper and lower fork arms of the axle support the same amount of weight, so that there is no danger of spreading the fork arms. Furthermore, by thus equalizing the strain upon the upper and lower bearings, less wear will occur than when all of the load supporting strain is placed upon the upper bearing, as in automobiles of the present day type.

In carrying out the above end, a further object is to provide a lower fork bearing of very simple construction, yet one which will be highly efficient for supporting part of the load.

Yet another object is to provide a novel yoke bar connected to the fork arms of the axle, whereby to rigidly connect them in such a manner as to positively prevent any spreading thereof.

With the foregoing principal objects in view, the invention resides in the construction, combination and arrangement of parts hereinafter described and claimed, the descriptive matter being supplemented by the accompanying drawings.

Figure 1 is a central vertical sectional view through the ends of the axle arms, the upper and lower bearings, and the wheel supported member to which said bearings connect said fork arms.

Figure 2 is a vertical sectional view at right angles to Fig. 1 as indicated by line 2—2 thereof.

Figure 3 is a top view of the wheel supported member and the axle connected thereto.

Figure 4 is a detail horizontal sectional view through the yoke bar, as indicated by line 4—4 of Fig. 2.

Figure 5 is a detail vertical sectional view showing a different form of bearing which may be used in connection with the lower fork arm, on comparatively light machines.

Figure 6 is a detail vertical sectional view showing a form of upper bearing which may be employed with light machines.

Figure 7 is a transverse sectional view somewhat similar to Fig. 2, but illustrating different forms of yoke bars and bearings.

In the drawings above briefly described, the numerals 1 designate several of the spokes of a well known form of demountable automobile wheel, said spokes being connected at their inner ends with the demountable hub section 2 which receives the inner hub section 3, the two sections being connected at their inner ends by pins 4 and at their outer edges by a wedge ring or cap 5, this construction being practically the same as that used on a great number of cars now manufactured. Instead of containing the front wheel bearings however, in the usual way, the inner hub section 3 carries a wheel spindle 6 which extends axially into the same and is preferably integral therewith as shown in Fig. 1. Supported on this spindle is a relatively fixed sleeve or hub member 7, appropriate bearings 8 being interposed between the parts 6 and 7 as shown. A nut 9 on the inner end of the spindle 6 secures the latter against withdrawal from the hub member 7 and the inner end of the latter is preferably provided with a cap 10 extending over said nut and serving to entrap a quantity of grease so as to effectively lubricate the bearings.

The hub member 7 is received between the upper and lower fork arms 11 and 12 of a forked front axle 13. The upper arm 11 of the fork is provided with a depending bearing stub 14 provided with a race ring 15 whose outer surface is tapered downwardly for contact with an annular series of roller bearings 16. These bearings are surrounded by a second race ring 17 whose inner surface is tapered downwardly. The parts 14, 15, 16 and 17 are received in a recess 18 in the top of the hub member 7 and said hub member is provided with an upwardly facing shoulder 19 near the lower end of the recess 18, against which the outer race ring 17 bears. It thus follows that any downward pressure on the fork arm 11, will force downwardly on the race ring 15, the rollers 16 will transfer the thrust to the ring 17, and this ring contacting with the shoulder 19, finally supports the weight on the wheel-supported hub member 7.

For connecting the bottom portion of the hub member 7 with the lower fork arm 12, a different construction of bearing is necessary. A bearing stub 20 is rigidly connected in any suitable way, as by screw threads 21, with the hub member 7 and depends therefrom in axial alinement with the stub 14, the lower end of said stub 20 being provided with an upwardly facing shoulder 22 which supports a race ring 23 having an upwardly tapered outer side. An annular series of roller bearings 24 contact with this tapered side of the race ring 23, and an outer race ring 25 surrounds said bearing rollers and is upwardly tapered on its inner side for contact therewith. The parts 20, 23, 24 and 25 are received in a recess 26 formed in the lower arm 12 of the axle fork, and the wall of said recess is provided near its upper end with an internal downwardly facing shoulder 27 which rests on the race ring 25.

By employing the construction previously described, all weight supported by the arm 12 will force this arm and its race ring 25 downwardly into tight contact with the bearing rollers 24, but the latter act on the race ring 23 and the stub 20 so that the weight is effectively supported. This is a marked improvement over a number of steering knuckles and the like which have been heretofore devised, in most of which no weight whatever is carried by the lower fork arm, independently of the upper bearings. However, by supporting the upper arm 11 on a wheel supported member such as 7, and by suspending the lower arm 12 from said member, for instance by means of a bearing stub 20 and associated parts, both the upper and lower arms are forced to carry part of the load, so that the strain is equally distributed and excessive wear of the upper bearing will not take place.

To prevent the entrance of dust and other foreign matter into the upper and lower recesses 18 and 26 respectively, which recesses necessarily contain oil for the bearing rollers, suitable packing rings 28 and 29 may be used and the lower end of the recess 26 is preferably closed by a screw cap 30, which abuts the lower end of the bearing stub 20 as seen in Fig. 1 so as to prevent the wheel from dropping with respect to the axle, whenever said wheel is momentarily free of the road. Cap 30 is preferably locked in place by means of a suitable set screw 31 having an appropriate locking device 32, and a similar screw 31' and locking device 32' are preferably employed for securing the stub 20 against possible movement with respect to the hub member 7.

To prevent any possibility of the arms 11 and 12 spreading, I tie the outer ends of said arms together by a vertical yoke bar 33 which is integral with the ends of the arms as shown for instance in Figs. 2 and 3, said yoke bar being located at one side of the hub member 7, while the other end of said member is provided with suitable means 34 for attaching a steering arm thereto.

While the yoke bar 33 may be of any adequate form, it is preferably of the cross sectional shape shown in Fig. 4. In this figure, as well as in Figs. 2 and 3, it will be seen that the bar 33 comprises a main central web 33$^a$ and two lateral webs 33$^b$, the latter being bent upon the former at their intermediate portions so as to not only reinforce said web 33$^a$ but to give sufficient clearance to permit the hub member 7 to swing within the fork of the axle, the necessary extent.

In the form of construction illustrated in Fig. 5, a bearing stub 20$^a$ depends from the wheel-supported member 7$^a$ and is provided with an upwardly facing shoulder 22$^a$. This stub is received in a recess 26$^a$ in the lower arm 12$^a$ of the axle and a downwardly facing shoulder 27$^a$ with which said arm is provided rests directly on the shoulder 22$^a$. This construction may well be used for light machines and it will be understood that the shoulders 22$^a$ and 27$^a$ will either be hardened or provided with bushings or washers.

Figure 6 discloses a bearing stub 14$^a$ on the upper arm of the axle provided with a hardened conical lower end 14$^b$ contacting with the similarly shaped bottom 18$^b$ of a recess 18$^a$ which is formed in the wheel-supported member 7$^b$, for the reception of said stub. This construction is usable principally on comparatively light machines.

In the form of construction shown in Fig. 7, the numerals 12$^b$ and 12$^c$ designate the upper and lower arms of the axle fork, which arms are tied together by yoke bars 33$^d$ which bars pass through ears 33$^e$ on the arms of the axle and are secured in place by nuts 33$^f$.

The upper arm 12$^b$ is provided with a depending bearing stub 14$^c$ having a hardened lower end 14$^d$. This stub is received in a recess 18$^c$ in the wheel-supported member 7$^c$, said recess being provided with a concave bottom 18$^d$ upon which the similarly shaped lower side of a wear-plate 18$^e$ contacts. Ball bearings 18$^f$ are positioned between the stub 14$^c$ and the plate 18$^e$ and it will be seen that this plate may slide slightly on the bottom 18$^d$, so as to equally distribute the weight on all of the balls 18$^f$. These balls are not merely disposed in an annular series, but they preferably cover substantially the entire area of the plate 18$^e$.

The lower side of the member 7$^c$ is provided with a depending stub 20$^d$ having an upwardly facing shoulder 20$^e$. The lower end of this stub is received in a recess 26$^d$ in the arm 12$^c$, which arm is provided with a downwardly facing shoulder 27$^d$. Ball bearings 27$^e$ are interposed between the two shoulders 20$^e$ and 27$^d$.

From the foregoing, taken in connection with the accompanying drawings, it will be seen that I have provided a steering knuckle and axle construction of such form as to be very advantageous, overcoming a number of difficulties heretofore encountered. Since excellent results may be obtained from the several details disclosed, such details may be followed if desired. I wish it understood however that within the scope of the invention as claimed, numerous changes may be made.

I claim:

1. In combination, a wheel supported hub shell, an axle having upper and lower fork arms in close proximity to the upper and lower sides of said hub shell, and means for holding said arms and shell against relative vertical movement and for pivoting said shell between said arms, comprising upper and lower weight supporting bearings associated with the upper and lower fork arms and equally distributing the entire load upon both of said arms.

2. In combination, an axle having a forked end, a wheel supported hub shell received between the fork arms of said axle, a weight supporting bearing pivotally connecting the upper fork arm with said hub shell, and a bearing stub depending from said shell and having an outstanding upwardly facing shoulder, the lower fork arm of the axle having a recess receiving the shouldered portion of said stub, said lower fork arm being provided with a downwardly facing shoulder extending inwardly from the wall of said recess, the shoulders of said stub and said lower fork arm being cooperable in supporting part of the weight of the axle and the load carried thereby.

3. In combination, an axle having a forked end, a wheel-supported member received between the fork arms of said axle, a weight supporting bearing pivotally connecting the upper fork arm with said member, a bearing stub depending from said member and having an external shoulder on its lower end, a race ring tapered upwardly on its outer side and resting on said shoulder around said stub, an annular series of bearing rollers engaging said outer side of said race ring, and an outer race ring tapered upwardly on its inner side and engaging said bearing rollers, the lower fork arm of the axle having a recess receiving said race rings, said rollers and said stub, the wall of said recess being provided with a shoulder resting on said outer bearing ring.

4. In combination, a wheel supported hub shell, an axle having upper and lower fork arms in close proximity to the upper and lower sides of said shell, a pair of weight supporting bearings pivoting said hub shell between said fork arms and holding said arms and shell against relative vertical movement, a lug on said hub shell at one side of the axle for attaching a steering arm to said shell, and a substantially C-shaped yoke bar at the other side of the axle joined rigidly to the outer ends of said fork arms to prevent relative movement of said arms and consequent uneven distribution of weight on said bearings; the side of the axle adjacent said lug being free from projecting parts interfering with the movement of the steering arm.

5. In combination, an axle having a forked end, a wheel-supported member between the arms of said fork, bearing means connecting the lower fork arm with said member, the upper side of the latter having a recess, and a bearing stub depending from the upper fork arm and rotatably received in said recess.

6. In combination, an axle having a forked end, a wheel-supported member between the fork arms of said axle, bearing means connecting the bottom of said member with the lower fork arm, the top of said member being provided with a recess, an outer race ring secured in said recess and held against downward movement therein, the inner side of said race ring being downwardly tapered, an annular series of bearing rollers contacting with said tapered side, another race ring within the series of rollers and having a downwardly tapered outer side contacting therewith, the upper end of said second race ring resting against the lower side of the upper fork arm, and an integral stub depending from said upper fork arm and snugly received in said second race ring.

In testimony whereof I have hereunto set my hand.

WILLIAM MARTIN JONES, Jr.